D. M. Holmes.
Box and Cake Mach.
N° 86,752. Patented Feb 9, 1869.

Witnesses;
A. W. Alingvist
Wm. A. Morgan

Inventor;
D. M. Holmes
per
Attorneys

United States Patent Office.

DANIEL M. HOLMES, OF WILLIAMSBURG, NEW YORK.

Letters Patent No. 86,752, dated February 9, 1869.

IMPROVED DOUGH-BOX FOR CAKE-MACHINES.

The Schedule referred to in these Letters Patent and making part of the same.

*To all whom it may concern:*

Be it known that I, DANIEL M. HOLMES, of Williamsburg, in the county of Kings, and State of New York, have invented a new and useful Improvement in Dough-Box for Cake-Machines; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to improve the construction of the dough-boxes of that class of machines in which the dough is cut off into cakes, or slices, as it is forced out through orifices in the bottom of the box; and It consists in the construction of said orifices, and of the parts connected therewith, so as to make the machine more accurate and satisfactory in operation, cutting off the cakes, or slices, of uniform thickness, as hereinafter more fully described.

A is the body of the dough-box, and

B is the follower, by means of which the dough is forced out through holes in the bottom, C, of the box A.

D is the knife-frame, to which are attached the knives E, by which the dough is cut off.

F are straps, or bars, attached to the bottom, C, upon each side of the holes in the said bottom, in such positions as to hold the knives E close up against the said bottom, while passing across the said holes, so that the knives may not be sprung by the downward pressure of the dough, enabling the slices, or cakes, to be cut smoothly, and of uniform thickness.

The particular arrangement of the bars or straps F must depend upon the arrangement of the knives E, and must consequently vary with the various arrangements of said knives.

G, H, I, and J, represent holes, working through the bottom, C, of the dough-box.

Figure 2:
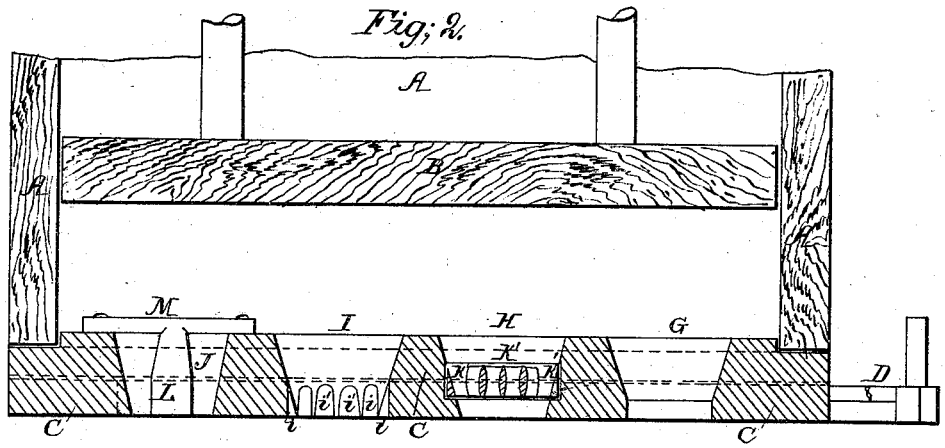
Figure 2 is a longitudinal section of the same, taken through the line $x\,x$, fig. 1.

The hole G is made conical, or tapering, through the upper part of the bottom plate C, and straight or cylindrical through the lower part of said bottom, C, as shown in fig. 2.

When the dough is forced out through a hole tapering through its whole length, as it passes over the sharp edge, at the lower end of said hole, it has a tendency to expand, and is liable to become ragged or untrue.

By constructing the holes in the manner represented by the hole G, this difficulty is avoided, and a further advantage is also obtained, viz, that the edge of the stream of dough is made straight and polished, or has a skin formed upon it, so that the cakes, when baked, will have a neater appearance, and will be of more uniform size.

When a stream of dough is forced out through a hole, the central part of said stream will move faster than the outer parts, so that the lower, or projecting end of said stream will be convex in form, causing the cakes, or slices, cut off to be thicker in the middle than at the edges. To prevent this, I place in the middle part of the hole through the bottom, C, a ring, K, supported by arms $k'$, extending to and supported by the sides of the said hole.

Or, if desired, the outer ends of the arms $k'$ may be attached to a ring fitting into a seat prepared for it in the sides of said hole, so that the inner surface of said ring may correspond with the surface of said hole.

The arms $k'$ should be made as thin as is possible, and yet give them sufficient strength to cause the least possible friction to the outer part of the stream of dough, while the middle part of said stream will be retarded by the ring K, so that the slices, or cakes, cut off may be of uniform thickness, the dough closing upon itself below the ring K, and passing out of the hole H in a solid stream.

Figure 1:
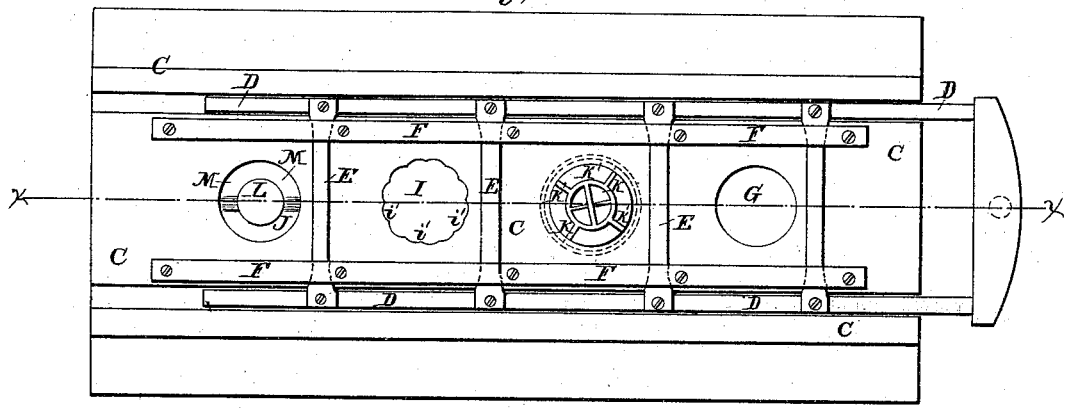
Figure 1 is a bottom view of a dough-box, illustrating my improvements.

The machine may be made to form cakes with scalloped edges, by scalloping the lower part of a conical or tapering hole, as shown in the hole I, figs. 1 and 2.

I prefer to form the scallops $i'$ vertical, as shown in fig. 2, which, in a measure, produces the same effect as the hole G, namely, the formation of a polished surface, or skin, upon the edge of the cake, or slice cut off, causing it to more perfectly retain its form while being baked.

L is a plug, or cylinder, which may be of any desired form, and which is placed in the centre of the holes in the bottom, C, with its lower end flush with the lower surface of said bottom, and with its upper end formed solid upon or securely attached to a cross-bar, M, the ends of which are secured to the inner side of the bottom, C.

As the dough is being forced out, it passes around the bar M, uniting again beneath it, passes out in the shape of a tube, and is cut off in the shape of ring-cakes, or slices.

The lower parts of the holes J may, if desired, be made straight, as hereinbefore described with reference to the holes G.

I claim as new, and desire to secure by Letters Patent—

1. The combination of the straps, or bars F with the knives of a dough-box, substantially as and for the purpose herein set forth and described.

2. Forming the discharge-holes through the bottom of a dough-box, with their upper part tapering, and their lower part straight, substantially as herein shown and described, and for the purpose set forth.

3. The combination of the ring K, or equivalent, with the discharge-holes through the bottom of a dough-box, substantially as and for the purpose herein set forth.

4. The combination of the plug, or central cylinder L, with the discharge-holes through the bottom of a dough-box, substantially as and for the purpose herein set forth and described.

The above specification of my invention signed by me, this 12th day of December, 1868.

DANIEL M. HOLMES.

Witnesses:
 FRANK BLOCKLEY.
 JAMES T. GRAHAM.